United States Patent Office 3,716,438
Patented Feb. 13, 1973

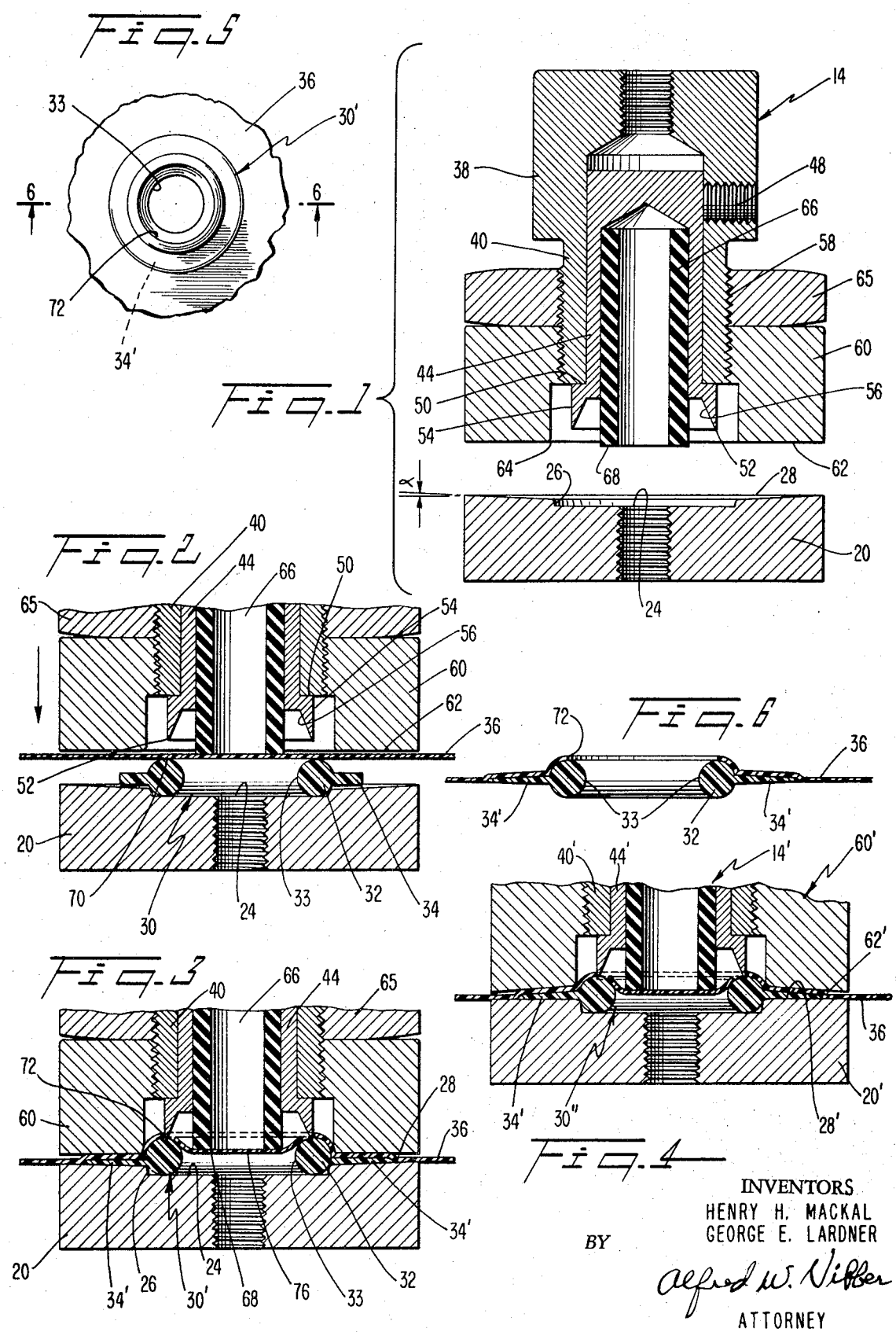

3,716,438
GROMMET SEALING APPARATUS AND METHOD
Henry H. Mackal, Fort Lauderdale, Fla., and George E. Lardner, Hawthorne, N.J., assignors to Halkey-Roberts Corporation, Paramus, N.J.
Filed Apr. 1, 1971, Ser. No. 130,170
Int. Cl. B32b 31/00
U.S. Cl. 156—253
18 Claims

ABSTRACT OF THE DISCLOSURE

Method of and apparatus for sealing annular members such as flanged plastic grommets to plastic sheet material. The apparatus includes opposing dies which are mounted on conventional electronic sealing machines. A flanged grommet is held in a first one of the dies, and a sheet of plastic material is superimposed upon such die and the grommet held thereby. The other, second die, which is mounted for reciprocation toward and away from the first die, carries a hole punch which, acting with the body of the grommet, first punches a hole in the sheet material. The disc cut from the sheet is pushed out of the way by a yieldable member centrally carried by the second die. The sheet material is then electronically welded to the flange of the grommet, such flange preferably being simultaneously thinned and radially expanded.

---

This invention relates to a method of and an apparatus for sealing annular members such as flanged plastic grommets to plastic sheet material.

Grommets such as those illustrated herein provide attractive, durable reinforcements for heat-sealable plastic sheeting such as shower curtains, beach bags, tents, inflatable toys, and the like. Unlike metal grommets, the plastic grommets never corrode or discolor, and cannot cut the sheet material. Their strength improvement factor is many times that of conventional plastic rings which are merely inserted in holes in the sheet material and crimped therein.

The invention has, among its objects, the provision of a method which permits an operator simply to load a grommet, position the sheeting with respect thereto, and punching the hole and sealing the grommet with a permanent bond in one operation.

A further object of the invention is the provision of an apparatus for carrying out the above method.

The above and further objects and novel features of the invention will more fully appear from the following description when the same is read in connection with the accompanying drawings. It is to be understood, however, that the drawings are for the purpose of illustration only, and are not intended as a definition of the limits of the invention.

In the drawings, wherein like reference characters refer to like parts throughout the several views:

FIG. 1 is a fragmentary view in vertical axial section through a first embodiment of die assembly in accordance with the invention, certain of the parts being shown in elevation;

FIG. 2 is a view similar to FIG. 1 of the grommet and sheet-engaging portion of the die assembly, a grommet and sheet being shown loaded into the die assembly preliminary to their being sealed together;

FIG. 3 is a view similar to FIG. 2 but showing the parts in a later stage of the sheet-cutting and grommet-sealing operation, the opposing dies having been brought together so as to cut out the portion of the sheet within the grommet, to thrust the cut-out portion of the sheet downwardly from its original plane, to thin the flange on the grommet in a radially outward direction, and to seal the sheet to the grommet;

FIG. 4 is a fragmentary view of a second embodiment of die assembly wherein the radially outward tapering of the flange on the grommet is accomplished by providing an inclined annular surface on the upper die of the die assembly rather than providing an inclined surface on the lower die of the die assembly as in the embodiment of FIGS. 1, 2, and 3;

FIG. 5 is a view in plan of a portion of a plastic sheet having a plastic grommet sealed thereto by the apparatus and in accordance with the method of the invention; and FIG. 6 is a view in vertical diametral section through the sheet and grommet of FIG. 5, the section being taken along the line 6—6 in FIG. 5.

It will be seen from the above that two embodiments of the apparatus in accordance with the invention are shown herein. The first such embodiment is shown in FIGS. 1, 2, and 3, whereas the second embodiment is shown in FIG. 4. Parts in FIG. 4 which are similar to those in FIGS. 1, 2, and 3 are designated by the same reference characters but with added primes.

As above-noted, the dies of the present invention in both the first embodiment (FIGS. 1, 2, and 3) and the second embodiment (FIG. 4) thereof are mounted upon conventional electronic sealing apparatus. Such apparatus includes a reciprocable plunger (not shown) and a table or support (not shown) aligned therewith and toward which the plunger advances in a sealing operation. An upper die assembly 14 is fixedly mounted upon the lower end of the plunger by means not shown.

The lower die 20 has a shallow, central recess 24 therein, the recess 24 having a depth which is generally equal to that of the body of the grommet 30, which is to be supported thereon, below the radially outwardly extending, vertically central flange 34 on the body 32 of the grommet; such body is in the form of a torus. The annular shoulder 26 of the lower die at the upper edge of the sidewall of recess 24 is gently rounded; the upper annular surface 28 of the lower die surrounding the recess or cavity 24 is very shallowly dished from the horizontal, the angle $\alpha$ at which it is dished being, for example, 2°. The grommet is made of heat-sealable material such as polyvinyl chloride. The apparatus of the invention, acting in a manner to be described, cuts a hole through a film or sheet 36 of heat-sealable material such as vinyl sheeting in alignment with the central hole 33 through the grommet. Thereafter the upper and lower dies, which are connected in circuit with a high-frequency electrical power source in a conventional manner, heat the grommet including the flange 34 thereof and now pierced vinyl sheeting as they are pressed together by the die, thereby electronically sealing them together.

The upper die assembly 14 has an upper or rear main part 38 which has a central, downwardly extending hollow shank portion 40. Within the central bore in the shank 40 there is positioned a vertical hollow knife 44 which is held in the part 38 by a set screw 48. At its lower end the knife 44 has a radial shoulder 50 which abuts against the lower, radially inner edge portion of the shank 40. The annular knife edge 52 is formed at the intersection of a vertical annular surface 54 at the lower end of the knife and an upwardly and inwardly converging frusto-conical surface 56.

The shank 40 is externally threaded at 58 as shown, and has threadedly mounted thereon in upper die 60 having a lower annular surface 62 confronting the surface 28. The surface 62 is flat, being disposed in a plane which is normal to the axis of the upper die assembly. As shown, the surfaces 28 and 62 of the lower and upper dies, respectively, have the same radially outer and inner diameters, and are aligned with each other. The outer diameter of dies 20 and 60 substantially exceeds the outer diameter of the flange 34 of the grommet before its application to sheet 36. The surface 62 has a rounded radially inner edge 64 similar to the rounded edge 26 of the lower die. By suitably turning the upper die 60 on the shank 40, the degree of exposure of the knife edge 52 with respect to the surface 62 may be adjusted as desired. The member 60 is retained in its thus-adjusted position on the shank 40 by a lock nut 65 threaded upon the shank.

In carrying out the method of the invention, a grommet is positioned in the lower die as shown in FIG. 2, after which an initially imperforate sheet of plastic material 36 is superimposed upon the grommet 30. The upper die is then lowered upon the superimposed grommet and sheet; preferably, the die member 60 is so adjusted relative to the knife edge 52 that the surfaces 28 and 62 engage the grommet flange 34 and sheet 36 to clamp them to some degree before the knife edge 52 cuts a hole through the sheet. After the upper die has advanced toward the lower die sufficiently for knife 52 to cut the hole in the sheet, the dies are connected to the high-frequency electrical power source so as to heat the flange of the grommet and the sheet as the dies 20, 60 continue their relative approach. The heating of the flange 34 of the grommet is sufficient to render it plastic to a substantial degree so that the flange is both radially expanded and radially thinned and tapered in a radially outward direction so as to conform to the space between the opposed die surfaces 28 and 62. The thus deformed flange of the grommet is designated 34' in FIGS. 3, 5, and 6.

It will be understood that the requisite taper between the opposed surfaces 28 and 62 may also be contributed entirely by the surface 62' (FIG. 4) the surface 28' then being flat and disposed normal to the axis of the support 12. In FIG. 4 the mounted grommet is generally designated 30'', the upper die is designated 60', the upper die assembly 14', and the lower die 20'.

Alternatively, part of such taper may be contributed by the lower surface (28) and the remainder by the upper surface (62).

The deformation of the flange of the grommet not only has the effect of enlarging it radially, thereby enlarging the area of seal, but also of causing the flange to have a feather edge, thereby rendering the joint between the flange on the grommet and the sheet less noticeable than it would otherwise be. The radial expansion of the flange of the grommet also has the effect of pulling the sheet radially outwardly in all directions around the hole 72 which has been cut therein, thereby holding the sheet flat in the zone of the seal. The mounted grommet, shown in FIG. 5 and FIG. 6, is designated 30', and the deformed progressively thinned and sealed flange is designated 34'.

In order to assure the displacement of the cutout portion of the sheet 34 from its original plane, there is provided an ejector member in the form of a heavy-walled rubber tube 66 which is thrust into the central bore in the annular knife and is frictionally retained therein. The tube 66 is of such length that its active, lower end 68 lies slightly below the cutting edge 52 of the knife. Upon the cutting of the sheet by the knife edge 52, which acts in conjunction with the uppermost annular zone 70 of the main body of the grommet, acting as an anvil, the surface 68 of the tube 66 thrusts the cut-out portion 76 of the plastic sheet 36 downwardly and out of its original plane, that it cannot interfere with the grommet-clamping and sealing operation.

The member 66 also has further valuable functions. With the upper die 60 adjusted as shown in FIGS. 1, 2, and 3, the sheet 36 is placed in tension between the lower surface 68 of member 66 and the gripping surfaces 28 and 62 of the lower and upper dies 20 and 60, respectively before the knife edge 52 engages the sheet 36. As a result the sheet is strongly pulled into engagement with the body 32 of the grommet at the zone 74 and is securely sealed to it at such zone. Further, because the sheet 36 is under tension at zone 70, it requires not much more than the touch of a sharp knife edge 52 upon the sheet 36 to shear the sheet cleanly at edge 72 of the thus-formed hole in the sheet.

Although the invention is illustrated and described with reference to a plurality of preferred embodiments thereof, it is to be expresssly understood that it is in no way limited to the disclosure of such preferred embodiments, but is capable of numerous modifications within the scope of the appended claims.

What is claimed is:

1. The method of mounting and sealing a heat-sealable annular member to an initially imperforate heat-sealable sheet, comprising presenting said annular member to a first die having a first, member-engaging annular die surface, placing a sheet of heat-sealable material upon the thus-engaged annular member, relatively advancing a second die which is aligned with the first die, and is provided with a second, member-engaging annular die surface aligned with and opposing the first such surface, toward the first die until the superimposed sheet and annular member are clamped between the opposed annular die surfaces, advancing an annular knife toward the sheet to engage the sheet at an annular zone which overlies and is backed up by an annular zone of the annular member, whereby to cut a hole through the sheet aligned with the hole in the annular member and subjecting the annular member and sheet to heat while thus-held to seal them together.

2. The method of claim 1, wherein the annular knife is mounted on the second die and moves with it.

3. The method of claim 2, wherein the annular knife is positioned so as to engage the sheet and cut it when the sheet and annular member are clamped between the two opposed die surfaces.

4. The method of claim 1, comprising heating the first and second dies by a source of high-frequency electric current after the hole has been cut in the sheet, whereby to heat the annular member and sheet to sealing temperature.

5. The method of claim 1, wherein the opposing annular die surfaces converge in a radial direction, and comprising advancing the dies toward each other after the annular member and the sheet have been heated and softened whereby to deform the radially outward portion of the annular member to thin it progressively in a radially outward direction.

6. The method of claim 1 comprising yieldingly thrusting the cut-out portion of the sheet out of the plane of the sheet.

7. The method of claim 1, wherein the annular member is supported upon the first die, and the sheet of heat-sealable material is superimposed upon the thus-held annular member.

8. The method of claim 1, wherein the annular member has a main body of toroidal shape, the annular member has a radially outwardly directed flange, and the annular zone of the sheet engaged and cut by the knife is coaxial of and overlies the body of the main body of the annular member.

9. The method of claim 1, comprising placing the sheet in tension in the portion thereof gripped between the dies before cutting the hole in the sheet.

10. The method of claim 9, wherein the annular member has a main body of toroidal shape, and the sheet is pulled across the annular member and down the sides thereof by the dies whereby the annular portion of the sheet immediately surrounding the hole therein is sealed to the toroidal body of the annular member.

11. Apparatus for mounting and sealing a heat-sealable annular member to an initially imperforate heat-sealable sheet, comprising a first die which is adapted to support the annular member, said first die having a first, annular member-engaging die surface, a second die aligned with the first die, the second die being provided with a second, annular member-engaging die suface opposing the first such surface, the two dies being relatively movable toward each other so as to clamp a sheet and an annular member upon which the sheet is superimposed between them, an annular knife mounted on the second die to engage the sheet at an annular zone which overlies and is backed up by an annular zone of the annular member, said knife being movable with the second die toward the clamped sheet so as to cut a hole in it in communication with the opening through the annular member, and means to subject the annular member and sheet to heat while clamped to seal them together.

12. The apparatus of claim 11, comprising a source of high-frequency electrical current, and means to heat the grommet and the portion of the sheet between the first and second dies by said high-frequency electrical current.

13. Apparatus for mounting and sealing a heat-sealable annular member to an initially imperforate heat-sealable sheet, comprising a first die which is adapted to support the annular member, said first die having a first, annular member-engaging die surface, a second die aligned with the first die, the second die being provided with a second, annular member-engaging die surface opposing the first such surface, the two dies being relatively movable toward each other so as to clamp a sheet and an annular member upon which the sheet is superimposed between them, an annular knife mounted on the second die and movable therewith toward the clamped sheet so as to cut a hole in it in communication with the opening through the annular member, and means to subject the annular member and sheet to heat while clamped to seal them together, the opposing annular die surfaces converging in a radially outward direction, whereby such die surfaces deform the annular member to thin it in a radially outward direction after such annular member has been heated and softened.

14. Apparatus for mounting and sealing a heat-sealable annular member to an initially imperforate heat-sealable sheet, comprising a first die which is adapted to support the annular member, siad first die having a first, annular member-engaging die surface, a second die aligned with the first die, the second die being provided with a second, annular member-engaging die surface opposing the first such surface, the two dies being relatively movable toward each other so as to clamp a sheet and an annular member upon which the sheet is superimposed between them, an annular knife mounted on the second die and movable therewith toward the clamped sheet so as to cut a hole in it in communication with the opening through the annular member, and means to subject the annular member and sheet to heat while clamped to seal them together, the annular member having a main body of toroidal shape, the annular member having a radially outwardly directed flange, and the annular zone of the sheet engaged and cut by the knife being coaxial of and overlying the body of the main body of the annular member.

15. The apparatus of claim 14, wherein the first die has a shallow circular recess coaxial of the annular knife, and an extended annular, at least generally flat surface radially outwardly of the recess, the recess being of such diameter and depth that the main body of the annular member is snugly received in the recess with the flange on the annular member lying on the generally flat, radially outer surface of the first die.

16. Apparatus for mounting and sealing a heat-sealable annular member to an initially imperforate heat-sealable sheet, comprising a first die which is adapated to support this annular member said first die having a first, annular member-engaging die surface, a second die aligned with the first die, the second die being provided with a second, annular member-engaging die surface opposing the first such surface, the two dies being relatively movable toward each other so as to clamp a sheet and an annular member upon which the sheet is superimposed between them, an annular knife mounted on the second die and movable therewith toward the clamped sheet so as to cut a hole in it in communication with the opening through the annular member, and means to subject the annular member and sheet to heat while clamped to seal them together, and means yieldingly thrusting the cut-out portion of the sheet out of the plane of the sheet.

17. The apparatus of claim 16, wherein the annular member has a main body of toroidal shape, and the means which yieldingly thrusts the cut-out portion of the sheet out of the plane of the sheet places the sheet in tension in the portion thereof gripped between the dies across the main body of the main body of the annular member before cutting the hole in the sheet.

18. The apparatus of claim 17, wherein one of the dies accurately receives the broad edge of the annular member, and the other of the dies accurately receives the other broad edge of the annular member and the sheet superimposed thereon, whereby the sheet is pulled down the sides of the annular member by the dies and the annular portion of the sheet immediately surrounding the hole therein is sealed to the toroidal body of the annular member.

References Cited
UNITED STATES PATENTS 3,069,303  12/1962  Scholle _____ 156—253

DOUGLAS J. DRUMMOND, Primary Examiner

U.S. Cl. X.R.

156—513